G. CUPPERS.
Level.
No. 51,564. Patented Dec. 19, 1865.
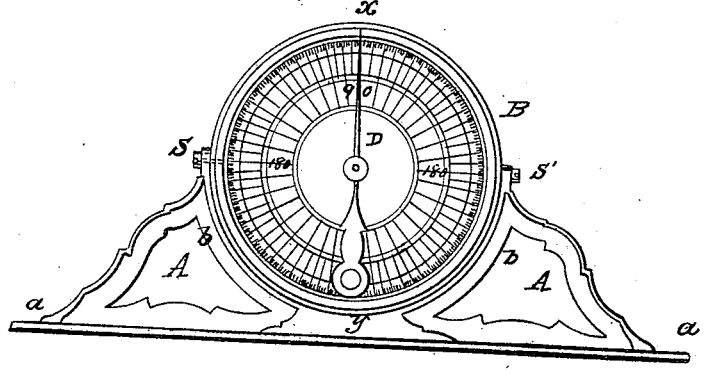
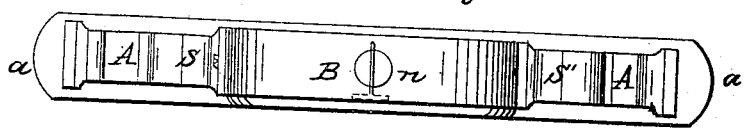
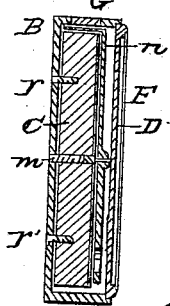
Witnesses
/ larre
Jos L Coombs
Inventor
Gustavus Cuppers
by A Pollok.
his atty

UNITED STATES PATENT OFFICE.

GUSTAVUS CUPPERS, OF NEW YORK, N. Y.

IMPROVEMENT IN PLUMB-LEVEL.

Specification forming part of Letters Patent No. 51,564, dated December 19, 1865.

*To all whom it may concern:*

Be it known that I, GUSTAVUS CUPPERS, of New York, in the county and State of New York, have invented certain new and useful Improvements in Gravitation-Level and Inclinometer; and I hereby declare that the following is a full, clear, and exact description of the same, reference being had to the accompanying drawings, in which—

Figure 1 is an elevation, and Fig. 2 a plan view, of an instrument constructed in accordance with this my invention, and Fig. 3 a vertical section of the same on line $x\,y$ in Fig. 1.

Numerous instruments have heretofore been devised to determine the horizontality of or the angle which any given plane surface may make with the horizon. By the ordinary spirit or water level, which has heretofore been generally used for indication of or adjustment to the level, it is impossible to determine the angle which the surface to which it is applied makes with the level, so that in connection with it other instruments were necessarily used. Again, to determine the verticality of surfaces, plumbs or pendulums have been employed, so that the measuring of angles—an operation so common and essential in most of the arts—involves the use of two or more ininstruments more or less bulky and requiring more or less practice or skill in the proper use of them.

The object of my invention is to combine all these in one instrument, which is designed for portability or compactness, delicacy and accuracy of operation, without liability to get out of order.

To enable others to make and use my improved apparatus, I shall now proceed to describe the manner in which the same is or may be constructed and used.

Referring to the drawings, A is the base or bracket or standard of the instrument. It consists of a rule, $a$, truly planed at its lower surface, having cast with it, on the upper part thereof, an ornamental support, $b$, within which is held, by means of screws $s\,s'$, a cylindrical casing, B. This casing is made of cast-iron, and is composed of a circular disk, constituting the back, and of a flange, which forms the sides, of the casing. Within this casing, and concentrically therewith, is held, by means of countersunk screws $r\,r'$, a wooden cylinder, to the face of which is applied a dial upon which is marked one or more complete circles with their subdivisions, according to the conventional division of angles, the whole circumference being divided into three hundred and sixty degrees. In this instance the dial is drawn or marked on paper, which is securely pasted or cemented onto the face of the wooden cylinder. In front of this dial, and in the center thereof, is suspended a pendulous index-hand, D, in the manner as follows: The hand D is of a length equal to the diameter of the dial, and is suspended at the center thereof by means of a double-pointed pivot. The points protruding in the rear and in the front thereof fit corresponding bearings. One of these bearings is formed in the forward end of the screw $m$, which passes through the center of the back of the casing and through the center of the wooden cylinder. The other bearing is formed by grinding or boring into the center of the glass plate E, which closes the face of the dial-casing.

The hand is weighted on one end, the other end being bent to lap over the cylindrical face of the wooden cylinder C.

In the top of the casing a round hole, G, is provided, closed by a transparent glass plate, through which the bent portion of the hand may be seen. The center of the hole G is situated on a perpendicular plane passing through the center of the dial, so that when the instrument is placed on a level the pendulous index-hand will occupy a vertical position in relation to the surface of support of the instrument and its bent portion or level-index $n$ will pass through the center of the circular hole G, before described.

The operation of this instrument will be readily understood from the construction of the apparatus. It will serve the purpose of a spirit or water level and indicate the horizontality of surfaces with utmost accuracy by placing the instrument upon its base upon the object the inclination or horizontality of the surface of which is to be determined. If the level index-hand $n$ occupies a central position in relation to the circular hole G, the surface will be horizontal. If the level-index do not pass through the center of the circle G, the degree of deviation or the angle which the surface makes with the horizon can be readily detected by looking at the face of the dial, where the hand will mark the number of degrees of the angle.

Again, if this instrument be applied to a wall, for instance, its verticality, or the number of degrees of deviation from the perpendicular, will be indicated in a similar manner.

Thus it will be seen that one instrument will answer the purpose of several others, as before set forth.

Having thus described my invention and the manner in which the same is or may be carried into effect, I claim—

1. The combined gravitation-level and inclinometer, when constructed, arranged, and operating substantially as herein described.

2. The combination, with a pendulum-hand, of a level-index and the circular opening in the top of the casing.

3. The method herein described of suspending the index-hand.

In testimony whereof I have signed my name to this specification before two subscribing witnesses.

GUSTAVUS CUPPERS.

Witnesses:
T. C. CAMPBELL,
JNO. S. HARLEY.